United States Patent Office 3,417,615
Patented Dec. 24, 1968

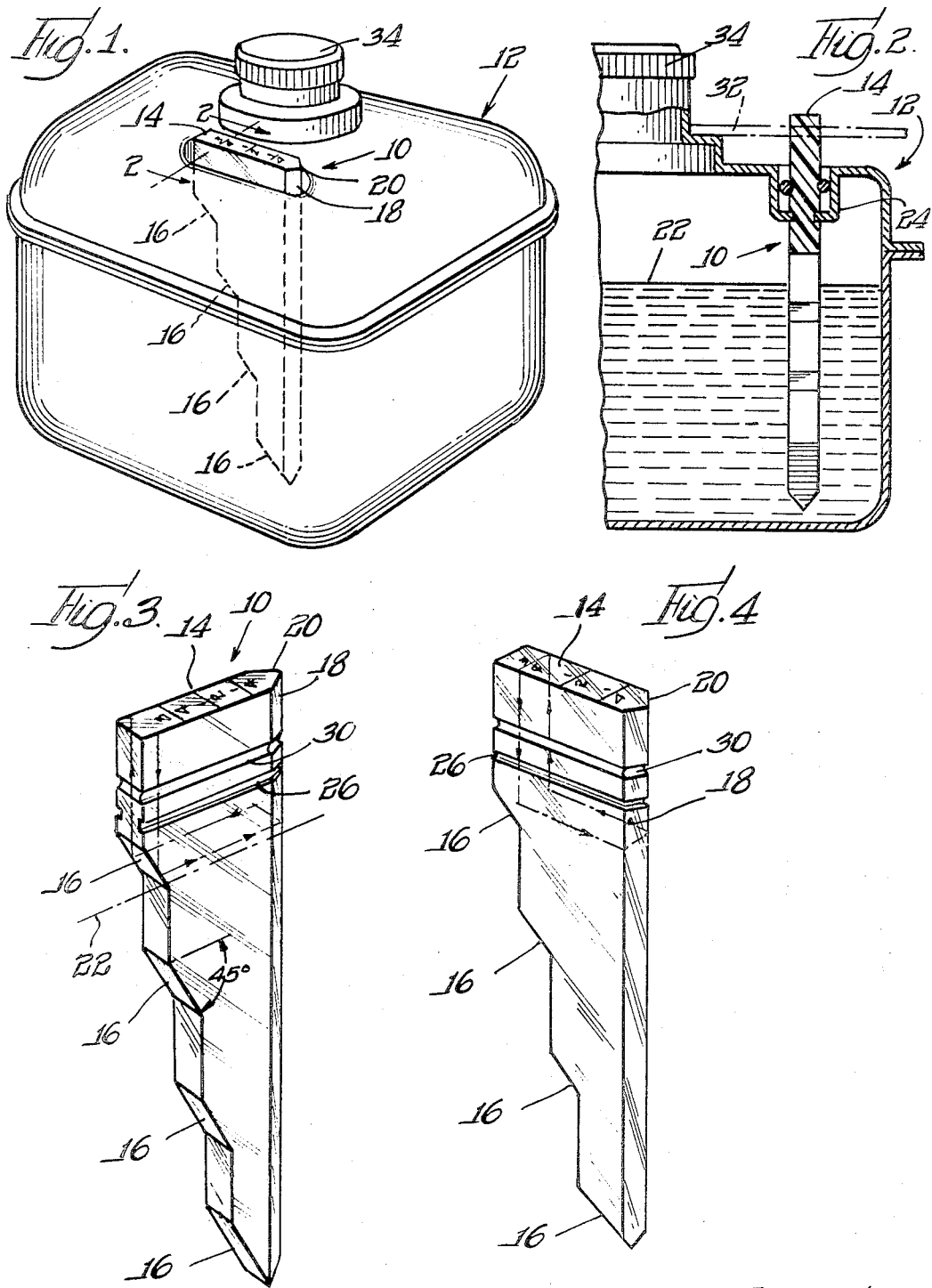

3,417,615
LIQUID LEVEL INDICATOR
Francis E. Ryder, Des Plaines, Ill., assignor to Illinois Tool Works Inc., Chicago, Ill., a corporation of Delaware
Filed Apr. 26, 1967, Ser. No. 633,828
6 Claims. (Cl. 73—327)

ABSTRACT OF THE DISCLOSURE

A liquid level indicator having a plate-like light transmitting body wherein a first light reflective edge of generally V-shaped cross-section depends from adjacent one extremity of the light receiving edge and a second light reflective means in the form of a series of step-like edge surfaces depends from an opposite extremity of the light receiving edge, the step-like surfaces being positioned for reflecting light to the generally V-shaped edge and back to the step-like surfaces and upwardly to the light receiving edge.

Disclosure of invention

This invention relates generally to liquid level indicators and more particularly to indicators of the light transmitting type adapted for use with containers designed to completely enclose a liquid body of substantial height.

The present invention contemplates a light transmitting liquid level indicator as set forth above which may depend from the wall of a container into a body of liquid, the height of which will fluctuate between low and relatively high levels.

It is a further object to provide a level indicator of the type set forth above which is relatively small in size, simple in construction, and efficiently operable to indicate infinite degrees of liquid levels over a relatively wide range.

To accomplish the above-mentioned objects and advantages, the invention contemplates the use of light transmitting and reflective material of new and novel geometric design.

The foregoing and other objects and advantages will be more apparent from the following detailed description, when considered in connection with the accompanying drawing, wherein:

FIG. 1 is a perspective view of a container adapted to completely enclose a liquid body of substantial height, said container having in operative association therewith a liquid level indicator embodying features of the present invention;

FIG. 2 is a fragmentary sectional view of the container taken substantially along the line 2—2 of FIG. 1;

FIG. 3 is a detailed perspective view of the level indicating member supported by the container shown in FIGS. 1 and 2; and FIG. 4 is another perspective view of the liquid level indicator member.

Referring now to the drawing more in detail, wherein like numerals have been employed to designate similar parts throughout the various views, it will be seen that for the purpose of illustrating one practical application of the present invention a liquid level indicating member of the type contemplated hereby is designated generally by the numeral 10, and is shown in operative association with a container or gasoline tank 12. The tank 12 is of the type adapted to completely enclose a liquid body of substantial height, as compared with relatively shallow type liquid containers. The plate-like member 10 is formed from suitable light transmitting materials, such as certain types of plastic and glass. Plastic material is preferable to glass in view of its resistance to breakage.

An upper edge surface 14 of the member 10 is adapted to be positioned externally of or substantially flush with the container 12 as shown in FIGS. 1 and 2, so as to be exposed to a source of light. Indicia provided along this upper edge surface 14 indicate various levels of liquid, such as one-quarter, one-half, three quarters, etc. Indicia may also be placed or engraved below the upper edge surface 14 in such a position as to permit the reflection thereof on said upper edge surface. It will be clear from the directional arrows and dotted lines associated therewith, that light is received by the edge surface 14 and directed downwardly to a series of surfaces 16 which are inclined at approximately 45° to the edge surface 14. In the aggregate, these surfaces 16 provide what might be correctly referred to as an arrangement of light reflective edge surface means extending downwardly from adjacent one extremity of the edge surface 14 in approaching relation with respect to the lower extremity of a vertical edge surface means consisting of vertical surfaces 18 and 20 disposed at right angles to each other. Depending upon the level of the liquid within the container 12, one of the surfaces 16 which is disposed at 45° with respect to the plane of the edge surface 14 will reflect light to one of the surfaces 18-20. Assuming light rays follow the dotted lines indicated by the directional arrows in FIGS. 3 and 4, from the surface 14 to the surface 16 and thence to the surface 18, said surface 18 will direct light rays to its companion oppositely disposed surface 20. From the surface 20, the light will be reflected back to the surface 16 and thence upwardly to the edge surface 14. The portion of the surface 14 receiving this reflected light will be illuminated so as to indicate the area within the container which is not occupied by liquid.

In FIGS. 2 and 3 the liquid level is indicated by dot-and-dash line 22. At this level, the container 12 is substantially three-quarters full, and therefore that portion of the surface 14 positioned to the left of the three-quarter mark will be illuminated, whereas the remainder of the surface will not be illuminated. In other words, that portion of the member 10 which is immersed within the liquid container 12 prevents light received by the exposed edge surface 14 from being reflected to said surface.

As shown in FIG. 2, the indicator member 10 is mounted within a depressed section 24 of the container 12. Longitudinal grooves 26 provided along opposite sides of the member 10 are designed to interlock with the flange portions of the depressed section 24. To prevent liquid in the container 12 from splashing externally, a suitable resilient sealing element or ring 28 is provided which encircles the member 10, and is wedged between said member and the adjacent walls of the section 24. The sealing ring 28 is lodged within an optional complementary groove 30 which encircles or partially encircles the member 10. A suitable guard member, indicated by dot-and-dash lines 32 of FIG. 2, may be positioned in superimposing relation with respect to the member 10 to counteract the accumulation of foreign matter, such as dust and dirt, in that vicinity. The container 12 is provided with a detachable closure member or cap to facilitate filling the container with liquid.

As mentioned, the area of the light receiving surface edge which is illuminated, indicates that portion of the container which is not occupied by liquid. The remaining unilluminated portion of the light receiving edge surface indicates the extent or degree of height occupied by the liquid in the container. Particular attention is directed to the fact that by having a series of light reflecting surfaces the member 10 may be of substantial length without increasing the overall length of the light receiving edge surfaces at the upper end of each member. In other words, the liquid level indicating member of the present invention is particularly adaptable for use with rather deep, as distinguished from shallow, containers. In instances where the container is relatively shallow, it may not be necessary to employ a series of step-like vertically spaced reflecting surfaces such as the surfaces 16, but rather one continuous edge surface extending from adjacent one end of the light receiving upper surface and extending downwardly and approaching the vertical edge surface or surfaces extending downwardly from the opposite extremity of said light receiving edge surface. Thus the use of the series of vertically spaced light reflecting surfaces 16 in the form of steps, makes it possible to indicate with accuracy the fluctuating levels of liquid within the container of substantial height, without substantially increasing the overall size of the light transmitting level indicator. It will be apparent that the invention contemplates liquid level indicators of extremely simple construction which are relatively inexpensive and yet very efficiently operable for their intended purpose. Obviously the light transmitting liquid level indicator member contemplated by the present invention is applicable for use in a wide variety of liquids as well as containers differing from the specific disclosures herein described.

While a specific structural form of light transmitting liquid level indicators has been disclosed in the drawing, it should be understood that the present invention contemplates other modifications and changes without departing from the spirit and scope of the appended claims.

The invention is claimed as follows:

1. A level indicator for indicating levels of liquid subject to fluctuation, including a one-piece plate-like light transmitting member having an upper light receiving edge surface means, generally vertical edge surface means including a pair of longitudinal, angularly disposed reflecting surfaces intersecting along a line extending downwardly from one extremity of said upper edge surface means, and light reflective edge surface means including a plurality of parallel, vertically spaced apart reflective surfaces positioned beneath complementary portions of said upper edge surface means in progressive approaching relation with respect to the lower extremity of said vertical edge surface means and adapted to be immersed within a body of liquid subject to level fluctuations, each of said vertically spaced light reflective surfaces comprising a flat surface inclined downwardly with respect to said upper edge surface means in approaching relation to said vertical edge surface means so as to receive light from and reflect light to complementary portions of said upper light receiving surface means only when said vertically spaced reflective surfaces are free from contact with the body of liquid with which the indicator is adapted to be used.

2. A level indicator for indicating levels of liquid subject to fluctuation as set forth in claim 1 wherein the vertically spaced reflective surfaces of the light reflective edge surface means are disposed at forty-five degrees with respect to the upper edge surface means.

3. A level indicator for indicating levels of liquid subject to fluctuation as set forth in claim 1 wherein the intersecting surfaces of said vertical edge means are positioned for receiving light from and reflecting light to said vertically spaced surfaces.

4. A level indicator for indicating levels of liquid subject to fluctuation as set forth in claim 3 wherein the light reflective surface area of the vertical edge surface means comprises a pair of longitudinal surfaces disposed at approximately ninety degrees with respect to each other.

5. A level indicator for indicating levels of liquid subject to fluctuation as set forth in claim 1 wherein the upper portion of said plate-like member is provided with means for accommodating a wall portion of a liquid container.

6. A level indicator for indicating levels of liquid subject to fluctuation as set forth in claim 1 wherein said vertically spaced light reflective surfaces are disposed at approximately forty-five degrees with respect to the line of intersection of the surfaces of said vertical edge surface means.

References Cited

UNITED STATES PATENTS

| | | | |
|---|---|---|---|
| 1,724,716 | 8/1929 | Kryzanowsky | 73—293 |
| 1,883,971 | 10/1932 | Kryzanowsky | 73—327 |
| 2,615,337 | 10/1952 | Maybach | 73—327 |
| 2,767,754 | 10/1956 | Lederer et al. | |
| 3,273,267 | 9/1966 | Willman | 73—327 X |

FOREIGN PATENTS

| | | |
|---|---|---|
| 490,441 | 2/1953 | Canada. |
| 412,803 | 7/1934 | Great Britain. |
| 672,539 | 5/1952 | Great Britain. |

S. CLEMENT SWISHER, *Primary Examiner.*

D. M. YASICH, *Assistant Examiner.*